(12) United States Patent
Chua et al.

(10) Patent No.: US 6,459,686 B1
(45) Date of Patent: Oct. 1, 2002

(54) MULTICHANNEL SELECTIVE CALL RECEIVER

(75) Inventors: Yong Tong Chua; Kim Hoong Ngai; Karl Robert Weiss, all of Singapore (SG)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/225,753

(22) Filed: Jan. 5, 1999

(30) Foreign Application Priority Data

Feb. 13, 1998 (SG) .............................................. 9800322

(51) Int. Cl.[7] ................................................. H04Q 7/00
(52) U.S. Cl. ........................ 370/313; 370/458; 455/426; 455/458; 340/7.42; 340/7.43
(58) Field of Search ................................. 370/311, 312, 370/313, 458; 455/426, 432, 458; 340/7.39, 7.4, 7.42, 7.43

(56) References Cited

U.S. PATENT DOCUMENTS

| 5,625,880 A | * | 4/1997 | Goldburg et al. | .......... 340/7.22 |
| 5,886,645 A | * | 3/1999 | Eaton | .......... 340/7.22 |
| 6,067,444 A | * | 5/2000 | Cannon et al. | .......... 340/7.44 |
| 6,275,698 B1 | * | 8/2001 | Hymel | .......... 455/432 |

* cited by examiner

Primary Examiner—Hassan Kizou
Assistant Examiner—Tim Spafford
(74) Attorney, Agent, or Firm—Daniel C. Crilly

(57) ABSTRACT

A pager (20) for operating within the communication environment of a cyclical frame based synchronous selective call system. The pager (20) has a receiver (22) for receiving selective call signals, a controller (25), a memory (26) to store signal parameters, a demodulator (27) and a decoder (28). In operation, receiver (22) processes selected frames within a selective call signal transmitted on a channel. During such operation, controller (25) determines whether to control receiver (22) to continue monitoring the channel or to scan for or select another channel to monitor for other selective call signals. A count of missed selected frames of a selective call signal is compared with a threshold count. This threshold count is based upon one of the signal parameters indicative of the selected frames. Controller (25) also schedules non-selected frames for processing when this signal parameter is greater than a predetermined number.

21 Claims, 2 Drawing Sheets

MULTICHANNEL SELECTIVE CALL RECEIVER

FIELD OF THE INVENTION

This invention relates to selective call receivers, such as pagers, for operating in the communication environment of frame based synchronous selective call systems. In particular, this invention relates to, but is not necessarily limited by, a multichannel selective call receiver and a method for channel monitoring therein.

BACKGROUND OF THE INVENTION

Multichannel selective call receivers, such as multichannel pagers, operating in the communication environment of synchronous selective call systems are known. Within the communication environment, selective call signals are received and processed by the multichannel selective call receivers to obtain information for users.

Conventionally, a cyclical frame based synchronous selective call system operates with a messaging protocol that specifies how information is encoded as frames onto radio frequency (rf) carriers or channels to form selective call signals. Typically, the messaging protocol also provides signal parameters for specifying which frames of a selective call signal have to be processed to obtain the information. These signal parameters can be encoded within the selective call signal or stored within a selective call receiver.

Frames specified for processing, henceforth referred to as selected frames, can be far apart from each other or closely spaced together within a selective call signal. In processing these selected frames, a selective call receiver can also check the quality of the selective call signal. For example, this quality can be checked by counting the selected frames detected over a period of time. By comparing a control setting with the number of selected frames detected, the selective call receiver can then determine whether to continue monitoring the channel to receive the selective call signal or to scan for other channels to monitor for selective call signals.

In most situations, detection of selected frames enables a selective call receiver to effectively determine whether a channel should still be monitored. However, problems can arise in some situations when fixed control settings are compared with selected frames that can vary in number for different selective call signals or for different selective call systems. For example, a small fixed control setting requires only a small number of selected frames for comparing. Such a small number may, however, be insufficient to reliably determine whether to continue monitoring the channel especially when the selected frames are closely spaced within a selective call signal. On the other hand, a large fixed control setting requires a long period of time to detect a sufficient number of selected frames that are spread far apart within a selective call signal. However, monitoring a channel over such a long period of time without receiving information is not efficient especially when the selective call receiver is powered by limited content batteries. Furthermore, even though a channel that is monitored does not have any information, other channels may be present in the communication environment to provide such information.

SUMMARY OF THE INVENTION

It is an object of this invention to provide a multichannel selective call receiver and a method for channel monitoring therein.

According to one aspect of the invention, there is provided a multichannel selective call receiver for operating within a cyclical frame based synchronous selective call system, said multichannel selective call receiver comprising:
- a signal monitor for monitoring a channel to receive a selective call signal;
- a signal processor for processing selected frames of said selective call signal, said selected frames occurring cyclically and regularly spaced between non-selected frames; and
- a controller coupled to said signal monitor and said signal processor,
- wherein, in response to a comparison of at least one predetermined number with a signal parameter indicative of number of said selected frames in a cycle, said controller is adapted to control said signal monitor and said signal processor to receive and to process one or more of said non-selected frames in addition to said selected frames to thereby determine whether to stop or to continue monitoring said channel.

Preferably, said controller can be further adapted to control said signal processor to detect each of said selected frames.

Suitably, said controller can be further adapted to count undetected ones of said selected frames.

Preferably, said controller can be further adapted to compare number of said undetected ones with a threshold count, said threshold count being based upon said signal parameter.

Suitably, said controller can be further adapted to control said signal monitor to monitor at least one other channel for selective call signals when said number of said undetected ones is greater than said threshold count.

Preferably, said controller can be further adapted to control said signal monitor to scan for said other channel.

Suitably, said controller can be further adapted to select said other channel from a memory within said multichannel selective call receiver.

Preferably, said controller can be further adapted to determine said signal parameter.

Suitably, said controller can be further adapted to schedule said one or more of said non-selected frames for processing when said signal parameter is greater than said predetermined number.

Preferably, said controller can be further adapted to select mandatory frames as said one or more of said non-selected frames.

Suitably, said signal monitor can comprise a receiver.

Preferably, said signal processor can comprise a demodulator.

Suitably, said signal processor can comprise a decoder.

According to another aspect of the invention, there is provided a method for channel monitoring by a multichannel selective call receiver operating within a cyclical frame based synchronous selective call system, said method comprising the steps of:
- monitoring a channel to receive a selective call signal;
- processing selected frames of said selective call signal, said selected frames occurring cyclically and regularly spaced between non-selected frames; and
- controlling, in response to comparing at least one predetermined number with a signal parameter indicative of number of said selected frames in a cycle, said steps of monitoring and processing to receive and to process one or more of said non-selected frames in addition to said selected frames to thereby determine whether to stop or to continue monitoring said channel.

Preferably, said step of processing can comprise the step of detecting each of said selected frames.

Suitably, said step of processing can further comprise the step of counting undetected ones of said selected frames.

Preferably, said step of processing can further comprise the step of comparing number of said undetected ones with a threshold count, said threshold count being based upon said signal parameter.

Suitably, said step of controlling can comprise the step of monitoring at least one other channel for selective call signals when said number of said undetected ones is greater than said threshold count.

Preferably, said step of monitoring can comprise the step of scanning for said other channel.

Suitably, said step of monitoring can comprise the step of selecting said other channel from a memory within said multichannel selective call receiver.

Preferably, said step of processing can comprise the step of determining said signal parameter.

Suitably, said step of controlling can comprise the step of scheduling said one or more of said non-selected frames for processing when said signal parameter is greater than said predetermined number.

Preferably, said step of scheduling can comprise the step of selecting mandatory frames as said one or more of said non-selected frames.

Suitably, said method can further comprise the step of waiting for a next frame to process.

BRIEF DESCRIPTION OF THE DRAWINGS

In order to describe the invention and to put it into practical effect, reference will now be made to a preferred embodiment as illustrated with reference to the accompanying drawings in which.

DETAILED DESCRIPTION OF THE INVENTION

One example of a cyclical frame based synchronous selective call system that supports multichannel selective call receivers is Motorola's FLEX™ roaming system. The FLEX™ roaming system will be used as an example to illustrate this invention. Conventionally, a FLEX™ selective call signal or FLEX™ signal provides a plurality of FLEX™ cycles transmitted on a channel. A FLEX™ multichannel selective call receiver or FLEX™ pager has to synchronize to this FLEX™ signal to selectively process frames within some of the FLEX™ cycles to obtain information.

Figure 1:
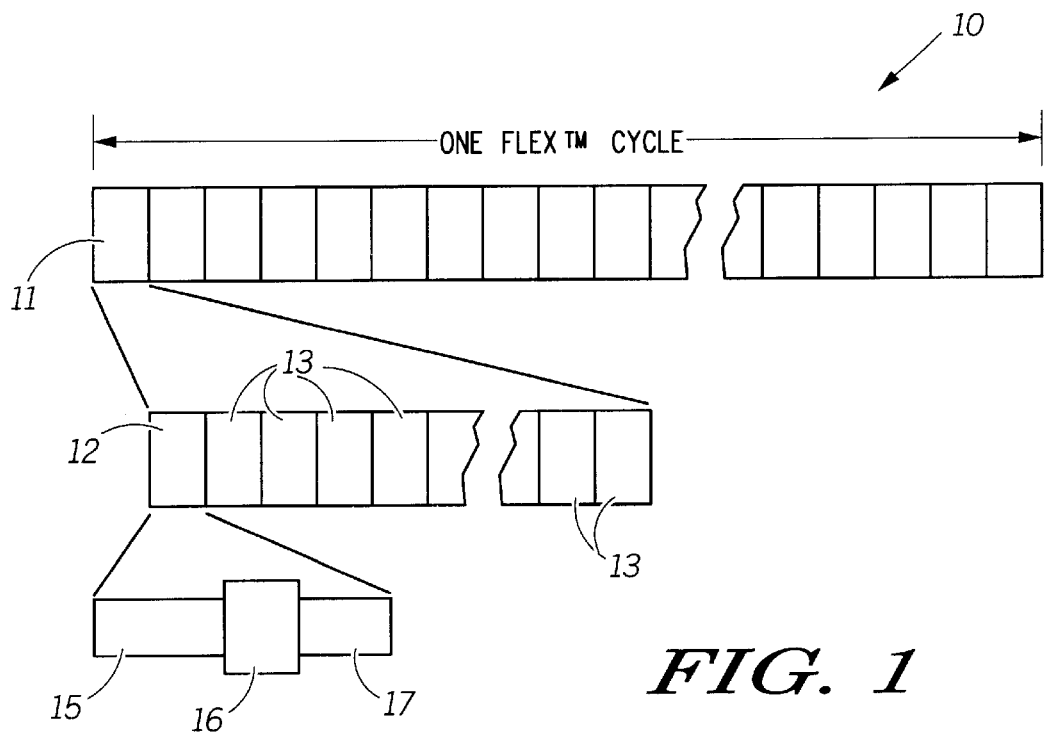
FIG. 1 shows basic structure of a FLEX™ cycle.

FIG. 1 shows basic structure of a FLEX™ cycle 10. The structure of cycle 10 is defined in accordance with the FLEX™ messaging protocol. Cycle 10 is cyclically transmitted on a channel and has one hundred and twenty-eight frames that are transmitted within a predetermined time of four minutes. These frames can be either mandatory frames or message frames. Mandatory frames have to be transmitted at the beginning of cycle 10 and provide information to FLEX™ pagers specifying signal parameters. A frame 11 is indicated in FIG. 1 and is partially exploded to show a synchronization codeword 12 and a plurality of data blocks 13. Frame 11 is illustrative of both mandatory and message frames. Synchronization codeword 12 contains three portions, namely, Sync_1 15, a frame information word 16 and Sync_2 17. A data block 13 includes an initial portion (not shown) that is referred to as a block information word (BIW) and which specifies information contained in the remaining portion of the data block 13.

Selected frames within cycle 10 of a FLEX™ signal provide information to a FLEX™ pager. Such frames are specified by signal parameters such as collapse cycles and addresses. To continue monitoring a channel for information from selective call signals, the FLEX™ pager conventionally checks Sync_1 15 and the BIW in the selected frames. Presently, when Sync_1 15 of a selected frame fails a data integrity test, then such a selected frame is regarded as an undetected or missed frame. When undetected or missed frames exceed a control setting known as a missed frame count, then the FLEX™ pager stops monitoring the channel.

Figure 2:
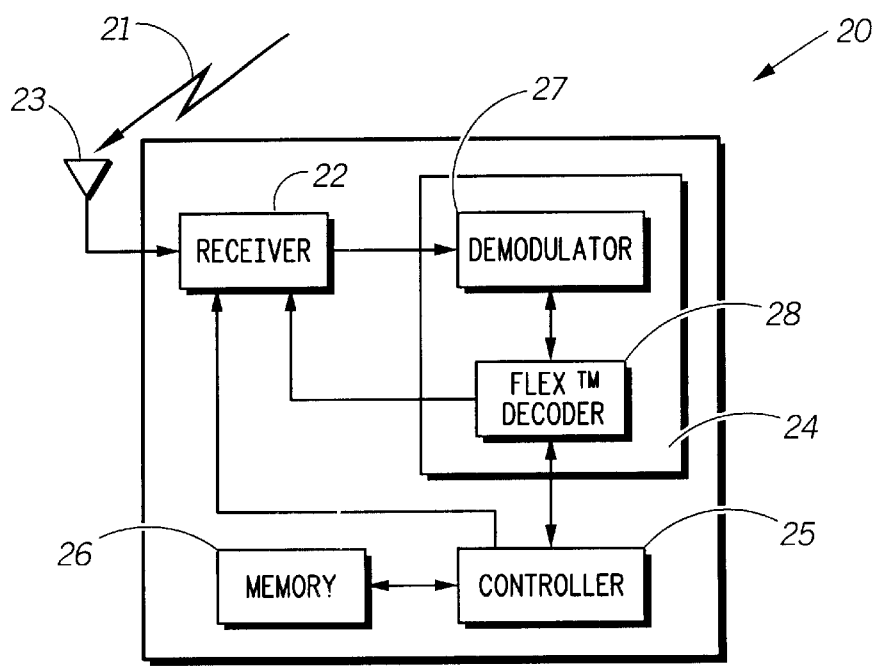
FIG. 2 is a block diagram of a FLEX™ pager in accordance with a preferred embodiment of the invention.

A block diagram of a FLEX™ pager 20 in accordance with a preferred embodiment of the invention is shown in FIG. 2. Pager 20 is operable within the communication environment of a FLEX™ roaming system to receive FLEX™ signals. These FLEX™ signals are cyclically transmitted on different radio frequency (rf) carriers or channels within the communication environment. Pager 20 can selectively monitor the different channels to receive one of the FLEX™ signals. A FLEX™ signal 21 is illustrated as an example in FIG. 2.

As shown in FIG. 2, pager 20 comprises a signal monitor for monitoring a channel to receive FLEX™ signal 21. The signal monitor comprises a receiver 22 coupled to an antenna 23. Pager 20 also comprises a signal processor 24 for processing selected frames from FLEX™ signal 21, a controller 25 coupled to the signal monitor and signal processor 24 and a memory 26 for storing signal parameters and at least one control setting. Such selected frames occur cyclically and are regularly spaced between non-selected frames in cycle 10. The signal parameters include collapse cycles that are indicative of number of selected frames in cycle 10. As is known in the art, these collapse cycles can be a system collapse or a pager collapse. Based upon the collapse cycles, controller 25 determines an operating collapse for pager 20.

In this preferred embodiment, the control setting is at least one predetermined number. Further in this preferred embodiment, signal processor 24 comprises a demodulator 27 and a FLEX™ decoder 28. Controller 25 couples to receiver 22, memory 26 and FLEX™ decoder 28 to process the selected frames and provide information to a user of pager 20.

In response to a comparison of the predetermined number with the operating collapse, controller 25 is adapted to control the signal monitor, particularly receiver 22, and signal processor 24 to receive and to process one or more of the non-selected frames in addition to the selected frames to thereby determine whether to stop or to continue monitoring the channel.

Advantageously, the invention enables controller 25 to more quickly determine whether to stop or to continue monitoring the channel by processing more frames within a shorter period of time. Hence, when the predetermined number is set to a value of five (5), then more frames are processed for operating collapses greater than five so that controller 25 does not have to process only selected frames indicated by such operating collapses. In this preferred embodiment, the non-selected frames are mandatory frames which are transmitted within every FLEX™ cycles. Such mandatory frames are therefore more likely to be present for detection when the channel is being monitored.

Figure 3:
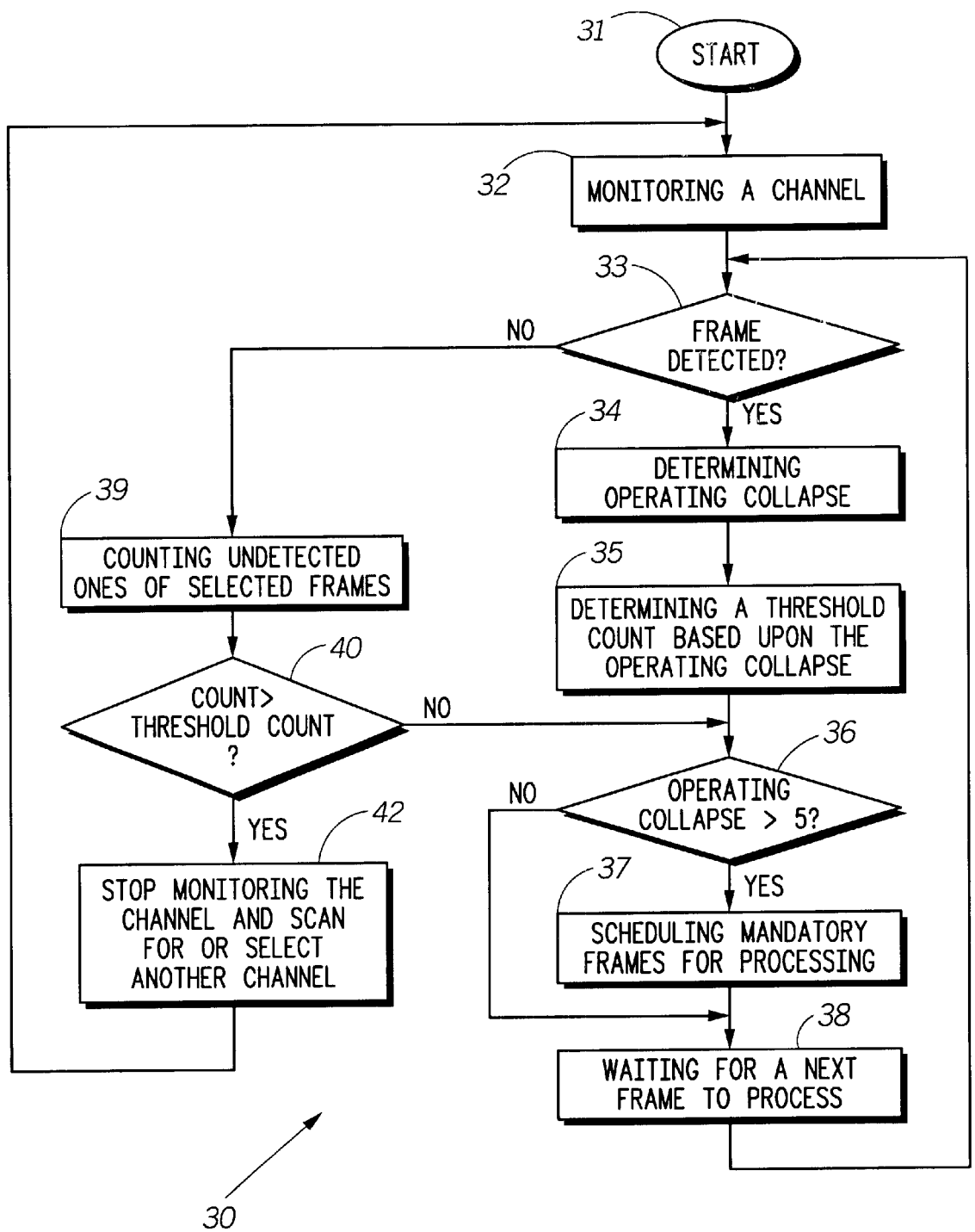
FIG. 3 is a flow diagram of a method for channel monitoring in the FLEX™ pager of FIG. 2.

Reference will now be made to FIG. 3 which shows a flow diagram of a method 30 for channel monitoring in pager 20. Starting from step 31, receiver 22 is monitoring a channel to receive FLEX™ signal 21 at step 32. At decision step 33, controller 25 checks whether a frame is detected.

When a frame is detected at decision step 33, method 30 continues to step 34 in which controller 25 determines the operating collapse for FLEX™ signal 21. Otherwise, with a "No" from decision step 33, method 30 continues by counting the frame as an undetected one at step 39.

From step 34, method 30 proceeds to step 35 in which controller 25 determines a threshold count based upon the operating collapse. One or more threshold counts associated with one or more operating collapses are stored within memory 26. Each of these threshold counts provides a reference for comparing with the number of undetected ones of the selected frames as will be explained below.

At decision step 36, the operating collapse is compared with the predetermined number which, for illustrative purposes, is five (5) in this preferred embodiment. Thus, when the operating collapse is greater than five, method 30 proceeds to step 37 in which controller 25 schedules one or more mandatory frames for processing. Otherwise, when the operating collapse is less than or equal to five, method 30 proceeds directly to step 38. At step 38, pager 20 is waiting for a next frame to process and method 30 returns to step 33. This next frame can be either a selected frame indicated by the operating collapse or a mandatory frame scheduled at step 37.

Following step 39, method 30 proceeds to decision step 40 in which controller 25 compares a count of undetected ones of the selected frames with the threshold count as determined at step 35. A default value for the threshold count is used for a frame that is undetected prior to step 35. This can occur when this frame is a first frame that is undetected upon method 30 starting at step 31. When the count of undetected ones of the selected frames is less than the threshold count, method 30 proceeds to step 36. Otherwise, with a "Yes" at decision step 40, method 30 proceeds to step 42 in which controller 25 is adapted to control receiver 22 to stop monitoring the channel. In addition, controller 25 is further adapted to control receiver 22 to either scan for or select at least one other channel to monitor for other FLEX™ signals. Information required by controller 25 to scan for or select such an other channel is stored within memory 26.

Advantageously, method 30 improves over conventional frame based synchronous selective call systems because channel monitoring by pager 20 is based upon varying operating collapses. By applying threshold counts that correspond with the varying operating collapses, that varies depending on. Hence, not being a fixed control setting, the threshold count of the invention can take into account operating collapses which specify few selected frames. Furthermore, the use of mandatory frames enables a faster determination of channel monitoring to reduce power consumption and to minimize a time period before pager 20 scans for or selects another channel to monitor for information.

Although the invention has been described with reference to a preferred embodiment using FLEX™ pager 20 and the FLEX™ roaming system as an example, it is to be understood that the invention is not restricted to the preferred embodiment described herein.

We claim:

1. A multichannel selective call receiver for operating within a cyclical frame based synchronous selective call system, said multichannel selective call receiver comprising:

a signal monitor for monitoring a channel to receive a selective call signal;

a signal processor for processing selected frames of said selective call signal, said selected frames occurring cyclically and regularly spaced between non-selected frames; and a controller coupled to said signal monitor and said signal processor, wherein, in response to a comparison of at least one predetermined number with a signal parameter indicative of number of said selected frames in a cycle, said controller is adapted to control said signal monitor and said signal processor to receive and to process one or more of said non-selected frames in addition to said selected frames to thereby determine whether to stop or to continue monitoring said channel.

2. The multichannel selective call receiver as claimed in claim 1 wherein said controller is further adapted to control said signal processor to detect each of said selected frames.

3. The multichannel selective call receiver as claimed in claim 2 wherein said controller is further adapted to count undetected ones of said selected frames.

4. The multichannel selective call receiver as claimed in claim 3 wherein said controller is further adapted to compare number of said undetected ones with a threshold count, said threshold count being based upon said signal parameter.

5. The multichannel selective call receiver as claimed in claim 4 wherein said controller is further adapted to control said signal monitor to monitor another channel for selective call signals when said number of said undetected ones is greater than said threshold count.

6. The multichannel selective call receiver as claimed in claim 5 wherein said controller is further adapted to control said signal monitor to scan for said another channel.

7. The multichannel selective call receiver as claimed in claim 5 wherein said controller is further adapted to select said another channel from a memory within said multichannel selective call receiver.

8. The multichannel selective call receiver as claimed in claim 1 wherein said controller is further adapted to determine said signal parameter.

9. The multichannel selective call receiver as claimed in claim 1 wherein said controller is further adapted to schedule said one or more of said non-selected frames for processing when said signal parameter is greater than said predetermined number.

10. The multichannel selective call receiver as claimed in claim 9 wherein said controller is further adapted to select mandatory frames as said one or more of said non-selected frames.

11. A method for channel monitoring by a multichannel selective call receiver operating within a cyclical frame based synchronous selective call system, said method comprising the steps of:

monitoring a channel to receive a selective call signal;

processing selected frames of said selective call signal, said selected frames occurring cyclically and regularly spaced between non-selected frames; and controlling, in response to comparing at least one predetermined number with a signal parameter indicative of number of said selected frames in a cycle, said steps of monitoring and processing to receive and to process one or more of said non-selected frames in addition to said selected frames to thereby determine whether to stop or to continue monitoring said channel.

12. The method as claimed in claim 11 wherein said step of processing comprises the step of detecting each of said selected frames.

13. The method as claimed in claim 12 wherein said step of processing further comprises the step of counting undetected ones of said selected frames.

14. The method as claimed in claim 13 wherein said step of processing further comprises the step of comparing number of said undetected ones with a threshold count, said threshold count being based upon said signal parameter.

15. The method as claimed in claim 14 wherein said step of monitoring comprises the step of monitoring another channel for selective call signals when said number of said undetected ones is greater than said threshold count.

16. The method as claimed in claim 15 wherein said step of monitoring comprises the step of scanning for said another channel.

17. The method as claimed in claim 15 wherein said step of monitoring comprises the step of selecting said another channel from a memory within said multichannel selective call receiver.

18. The method as claimed in claim 11 wherein said step of processing comprises the step of determining said signal parameter.

19. The method as claimed in claim 11 wherein said step of controlling comprises the step of scheduling said one or more of said non-selected frames for processing when said signal parameter is greater than said predetermined number.

20. The method as claimed in claim 19 wherein said step of scheduling comprises the step of selecting mandatory frames as said one or more of said non-selected frames.

21. The method as claimed in claim 20 wherein after said step of scheduling said method further comprises the step of waiting for a next frame to process.

* * * * *